United States Patent
Rowell

(10) Patent No.: US 10,633,027 B2
(45) Date of Patent: Apr. 28, 2020

(54) ENHANCED VIRTUAL LANE MARKER DATA FOR CONVEYING A VEHICLE OPERATIONAL STATE

(71) Applicant: Toyota Research Institute, Inc., Los Altos, CA (US)

(72) Inventor: Todd J. Rowell, Arlington, MA (US)

(73) Assignee: Toyota Research Institute, Inc., Los Altos, CA (US)

(*) Notice: Subject to any disclaimer, the term of this patent is extended or adjusted under 35 U.S.C. 154(b) by 47 days.

(21) Appl. No.: 15/629,046

(22) Filed: Jun. 21, 2017

(65) Prior Publication Data

US 2018/0370567 A1 Dec. 27, 2018

(51) Int. Cl.
| | | |
|---|---|---|
| *B60K 35/00* | (2006.01) | |
| *B62D 15/02* | (2006.01) | |
| *B60W 30/12* | (2020.01) | |
| *G06T 19/00* | (2011.01) | |
| *B60W 50/14* | (2020.01) | |

(52) U.S. Cl.
CPC .......... *B62D 15/0295* (2013.01); *B60K 35/00* (2013.01); *B60W 30/12* (2013.01); *B60W 50/14* (2013.01); *G06T 19/006* (2013.01); *B60K 2370/188* (2019.05); *B60W 2050/146* (2013.01); *B60W 2520/10* (2013.01); *B60W 2550/12* (2013.01); *B60W 2550/22* (2013.01)

(58) Field of Classification Search
CPC ................................................ B60K 2370/00
See application file for complete search history.

(56) References Cited

U.S. PATENT DOCUMENTS

| | | | |
|---|---|---|---|
| 4,214,265 A | 7/1980 | Olesen | |
| 8,184,859 B2* | 5/2012 | Tanji | G06K 9/00798 |
| | | | 382/103 |
| 9,318,018 B2 | 4/2016 | Park et al. | |
| 9,544,546 B2* | 1/2017 | Suzuki | G08G 1/167 |
| 2004/0017282 A1 | 1/2004 | Eguchi et al. | |
| 2005/0125153 A1* | 6/2005 | Matsumoto | B60T 8/17557 |
| | | | 701/300 |
| 2010/0138115 A1* | 6/2010 | Kageyama | B60R 21/0134 |
| | | | 701/46 |
| 2010/0295668 A1* | 11/2010 | Kataoka | B62D 15/025 |
| | | | 340/435 |
| 2011/0010021 A1* | 1/2011 | Kobayashi | B60T 8/17557 |
| | | | 701/1 |
| 2011/0301813 A1* | 12/2011 | Sun | B62D 15/029 |
| | | | 701/41 |
| 2015/0227800 A1* | 8/2015 | Takemae | B60R 1/00 |
| | | | 382/104 |

(Continued)

FOREIGN PATENT DOCUMENTS

JP 2008-152438 A 3/2008

*Primary Examiner* — Truc M Do
(74) *Attorney, Agent, or Firm* — Christopher G. Darrow; Darrow Mustafa PC

(57) ABSTRACT

A method and device are disclosed. Vehicle sensor data may be compared with a threshold value. When the vehicle sensor data exceeds the threshold value, selecting an appearance mode of a plurality of appearance modes, and applying the first appearance mode to virtual lane marker data to produce enhanced virtual marker data. The enhanced virtual marker data may be transmitted for display by a vehicle graphical user interface.

18 Claims, 7 Drawing Sheets

(56) References Cited

U.S. PATENT DOCUMENTS

| | | | |
|---|---|---|---|
| 2016/0167514 A1* | 6/2016 | Nishizaki | G02B 27/0101 345/7 |
| 2016/0314359 A1* | 10/2016 | Sakamoto | G06K 9/00798 |
| 2016/0339959 A1* | 11/2016 | Lee | B62D 15/0265 |
| 2017/0154554 A1* | 6/2017 | Tanaka | G06K 9/00798 |
| 2018/0058873 A1* | 3/2018 | Huang | G01C 21/365 |

* cited by examiner memory 206 plurality of appearance modes 306
(relating display attributes for virtual lane marker data 314)

normal display attributes 500
of virtual lane marker data
314 vehicle graphic
user interface 220 vehicle graphic
user interface 220

ENHANCED VIRTUAL LANE MARKER DATA FOR CONVEYING A VEHICLE OPERATIONAL STATE

FIELD

The subject matter described herein relates in general to virtual lane marker devices and, more particularly, to enhanced virtual lane marker data operable to convey a vehicle operational state and to prompt vehicle operator responses thereto.

BACKGROUND

Generally, virtual lane marker displays have been available for driver-assist vehicle operation. The displays have indicated to a vehicle operator a lane departure warning, and a lane keeping assist; that assist the vehicle operator to not deviate from a traffic lane, as well as provide navigational indicators for turns, lane changes, etc. Virtual lane marker displays, however, have not been able to convey much more than lane boundaries and/or navigational information. It is a desirable for virtual lane marker display to convey vehicle operational parameters to a vehicle user, and to prompt a vehicle response thereto.

SUMMARY

A device and method for selecting an appearance mode for virtual lane marker data based on vehicle sensor data in relation to a threshold value are disclosed.

In one implementation, a method is disclosed. The method includes receiving vehicle sensor data, and comparing the vehicle sensor data with a threshold value. When the vehicle sensor data exceeds the threshold value, selecting a first appearance mode of a plurality of appearance modes, applying the first appearance mode to virtual lane marker data to produce enhanced virtual marker data, and transmitting the virtual lane marker data for display by the vehicle graphical user interface.

In another implementation, a vehicle control unit is disclosed. The vehicle control unit includes a communication interface to service communication with a vehicle network, a processor communicably coupled to the communication interface, and memory communicably coupled to the processor. The memory stores an appearance module, a graphics engine module, and a transmission module. The appearance module includes instructions that, when executed by the processor, cause the processor to receive vehicle sensor data, and compare the vehicle sensor data with a threshold value. When the vehicle sensor data exceeds the threshold value, the instructions cause the processor to select a first appearance mode of a plurality of appearance modes. The graphics engine module includes instructions that, when executed by the processor, cause the processor to apply the appearance mode to virtual lane marker data to produce enhanced virtual maker lane data. The transmission module includes instructions that, when executed by the processor, cause the processor to transmit the enhanced virtual lane marker data as vehicle graphical user interface data via the communications interface for display by a vehicle graphical user interface.

BRIEF DESCRIPTION OF THE DRAWINGS

The description makes reference to the accompanying drawings wherein like reference numerals refer to like parts throughout the several views, and wherein.

DETAILED DESCRIPTION

A method and device for enhancing virtual lane marker data to further convey operational conditions and/or states of a vehicle, and to prompt a response thereto by a vehicle operator is disclosed. In the context of vehicle-to-human communication, such visual and/or audible communications enhance driver-assist modes of operation, as well as provide improved vehicle-to-human communication with vehicle passengers when a vehicle may operate in an autonomous mode of operation. Also, enhanced virtual lane marker data may operate to prompt a vehicle user response to a state of the vehicle operation, such as decreasing a vehicle speed that has exceeded a speed threshold value.

Figure 1:
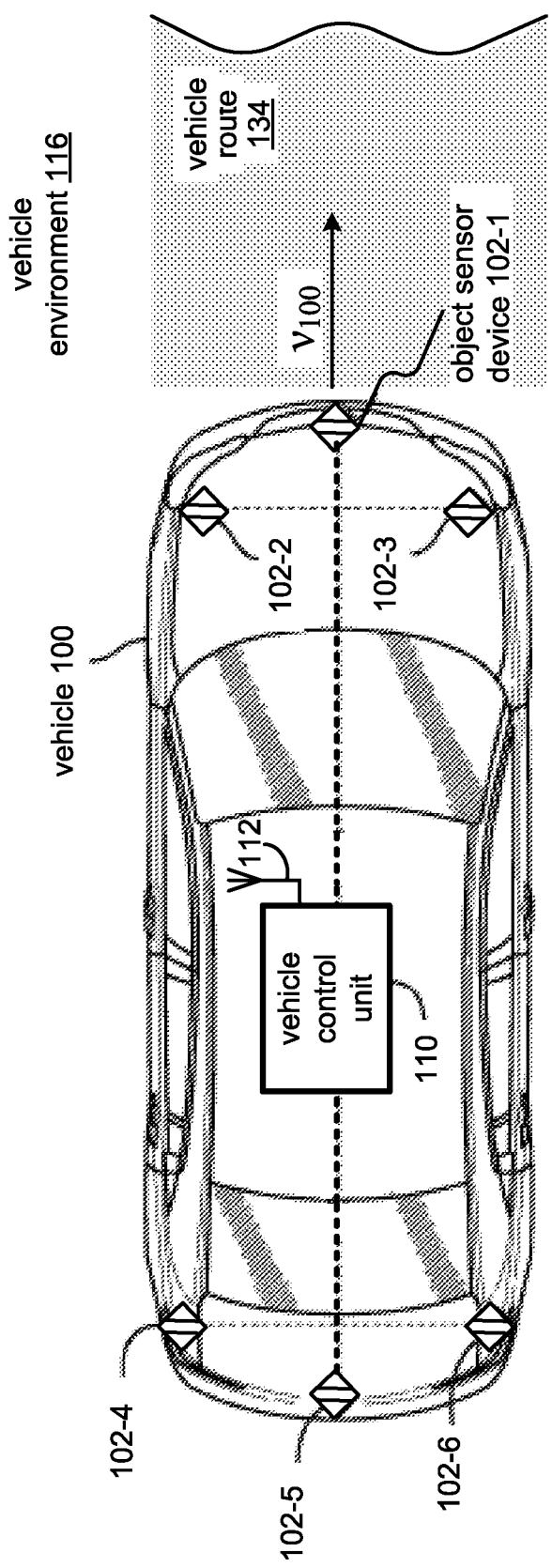
FIG. 1 is a schematic illustration of a vehicle including a vehicle control unit.

FIG. 1 is a schematic illustration of a vehicle 100 including a vehicle control unit 110. A plurality of object sensor devices 102-1, 102-2, 102-3, 102-4, 102-5 and 102-6 (generally, object sensor devices 102) are in communication with the control unit 110 to access a vehicle environment. As may be appreciated, the vehicle 100 may also be an automobile, light truck, cargo transport, or any other passenger or non-passenger vehicle.

The plurality of sensor devices 102 may be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device.

Communication between sensor devices and vehicle control units, including vehicle control unit 110, may be on a bus basis, and may also be used or operated by other systems of the vehicle 100. For example, the object sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

Outputs of the example object sensor devices 102 may be used by the vehicle control unit 110 to detect vehicle lane boundaries for a roadway, objects in a vehicle route 134, capture live video of the vehicle environment 116, determine a vehicle velocity, etc.

The object sensor devices 102, by way of example, may operate to provide tactile or relational changes of the vehicle environment 116, such as an approaching pedestrian, cyclist, object, vehicle, road debris, and other such vehicle obstacles (or potential vehicle obstacles). Further, the object sensor devices 102 may operate to detect a vehicle lane of a roadway, and generate virtual lane marker data for display to a vehicle operator and/or passenger.

The object sensor devices 102 may be provided by a Light Detection and Ranging (LIDAR) system, in which the sensor input devices 102 may capture data related to laser light returns from physical objects in the environment of the vehicle 100. The sensory input devices 102 may also include a combination of lasers (LIDAR) and milliwave radar devices. LIDAR and radar based devices may operate to sense objects along with a velocity (that is, relative and/or absolute velocities) of the objects.

The object sensor devices 102 may, alone or in combination, operate to capture depth images or otherwise generating depth information for a captured image. For example, the object sensor devices 102 may configured to capture images (visual and non-visual spectrum wavelengths, audible and non-audible wavelengths, etc.).

In this aspect, the object sensor devices 102 are operable to determine distance vector measurements of objects in the vehicle environment 116. For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of objects.

In operation, objects such as terrain, foliage, pedestrians, etc., may be detected using multiples of the object sensor devices 102-1 through 102-6 in combination or independently. In one example, object sensor devices 102-1, 102-2, and 102-3 may operate to detect objects ahead of the vehicle 100, and object sensor devices 102-4, 102-5 and 102-6 may operate to detect objects behind the vehicle 100.

Also, each of the object sensor devices 102 may implement respective functions to provide a collective object parameter detection based on respective spatial portions 118. For example, object sensor device 102-1 may operate to detect an object, and object sensor device 102-2 may operate to detect an object velocity relative to the vehicle 100. Also, object sensor device 102-3 may operate in combination with object sensor device 102-1 to corroborate a sensing and/or detection of an object. As may be appreciated, an object's velocity may be determined via an object sensor device, may be extrapolated by successive position detection measurements of the object, and calculating speed and/or direction of motion based thereon (such as to form a motion vector).

As may be appreciated, respective sets of object sensor devices may operate in combination with other sets of object sensor devices, may operate in an alternately or asynchronously, simultaneously, or individually based upon a desired sensing function and/or application.

In operation, the vehicle control unit 110 may operate to generate virtual lane marker data as the vehicle 100 travels a roadway. The roadway may include a dotted center line and road edges. The roadway can also include several lanes on each side of a center line to define multiple roadway lanes.

The vehicle control unit 110 may operate to receive vehicle sensor data output by object sensor devices 102, which may provide a LIDAR system. The object sensor devices may capture and send vehicle sensor data related to laser returns from physical objects in the area surrounding the vehicle 100 while traveling at a velocity $V_{100}$, along the vehicle route 134. As an example, signal returns may include vehicle route markings, such as a center line, lane lines, and edges of the vehicle route 134, traffic signage, etc. As may be appreciated, with this vehicle sensor data, vehicle control unit 110 may operate to generate virtual lane marker data that may be presented for display to a vehicle user of a graphical user interface device, such as a heads up display, a head unit display, dash display, etc. The vehicle control unit 110 may operate to select an appearance mode to produce enhanced virtual lane marker data based on vehicle sensor data relating to vehicle operation (such as velocity, acceleration, deceleration, etc.) in relation to a threshold value, as is discussed in detail with reference to FIGS. 2-8.

Figure 2:
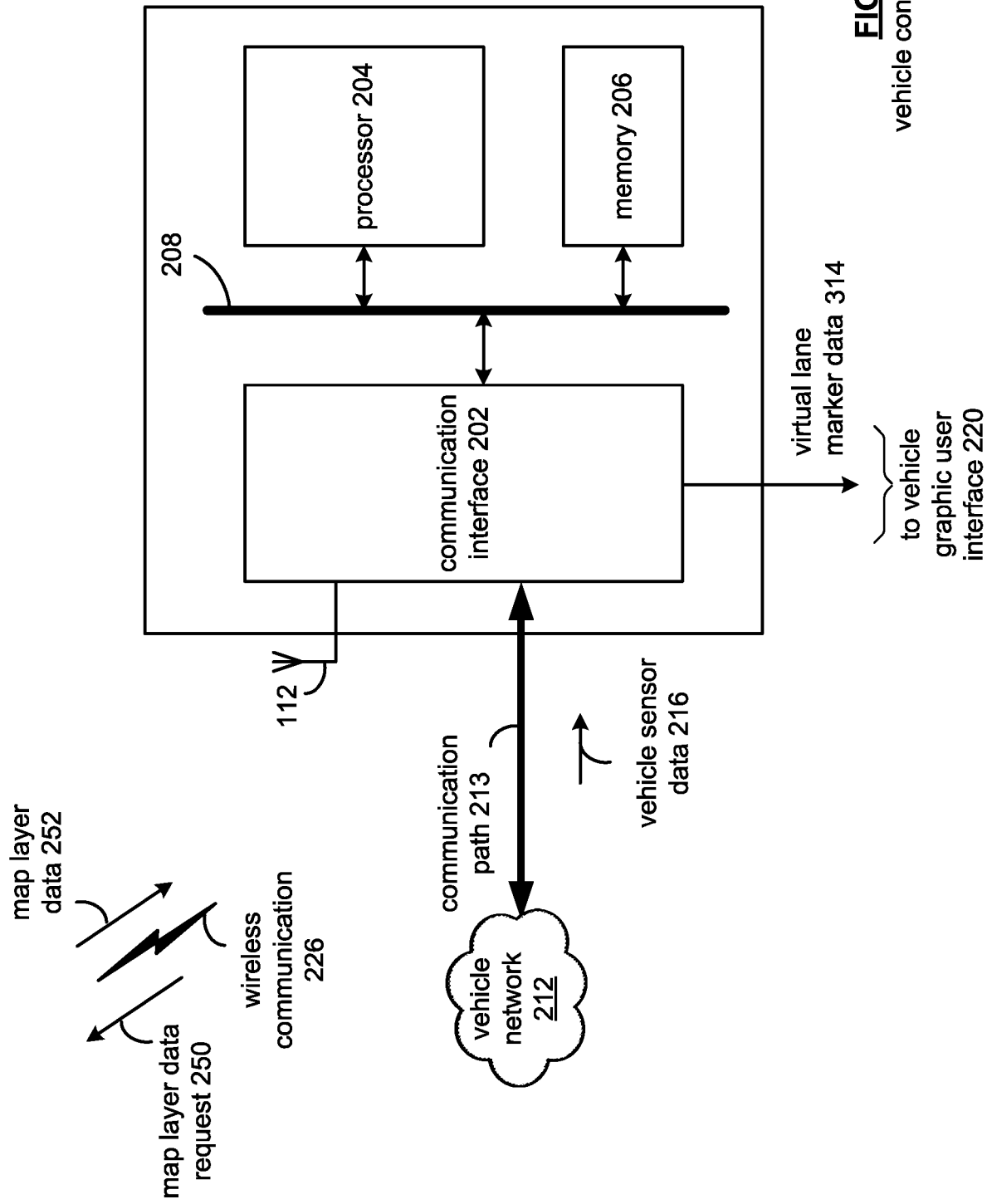
FIG. 2 shows a functional block diagram of the vehicle control unit of FIG. 1.

FIG. 2 is a block diagram of a vehicle control unit 110, which includes a communication interface 202, a processor 204, and memory 206, that are communicably coupled via a bus 208. The vehicle control unit 110 may provide an example platform for the device and methods described in detail with reference to FIGS. 1-8.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-8.

The vehicle control unit 110 can include one or more modules, at least some of which are described herein. The modules can be implemented as computer-readable program code that, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The vehicle control unit 110 may be communicatively coupled to receive signals from global positioning system satellites, such as via the antenna 112 of the vehicle control unit 110, or other such vehicle antennae (not shown).

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

In operation, the vehicle control unit 110 may receive map layer data 252 in response to a map layer data request 250. Map layer data 252 may be provided by a third-party server operated by an organization that provides applications, such as a mapping application and map application layer data that includes roadway information data, traffic layer data, geo-location layer data, etc.

Map layer data 252 may include roadway data that may be utilized by the vehicle control unit 110 to generate virtual lane marker data. For example, map layer data 252 may be provided in a Route Network Description File (RNDF) format. A Route Network Description File specifies, for example, accessible road segments and provides information such as waypoints, stop sign locations, lane widths, checkpoint locations, parking spot locations, etc. The route network has no implied start or end point. Servers such as server 233 may also provide data as Mission Description Files (MDF) for autonomous and/or driver-assist vehicle operation. Mission Description Files (MDF) may operate to specify checkpoints to reach in a mission, such as along a travel route 134 (FIG. 1).

The wireless communication 226 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to receive vehicle sensor data, and select an appearance mode of a plurality of appearance modes based on the vehicle sensor data in relation to a threshold value. When executed by the processor 204, the associated instructions cause the processor to apply appearance mode to virtual lane marker data to produce enhanced virtual lane marker data, and to transmit the enhanced virtual lane marker data for display by a vehicle graphical user interface via the communication interface 202, as is discussed in detail with reference to FIGS. 3-8.

Figure 3:
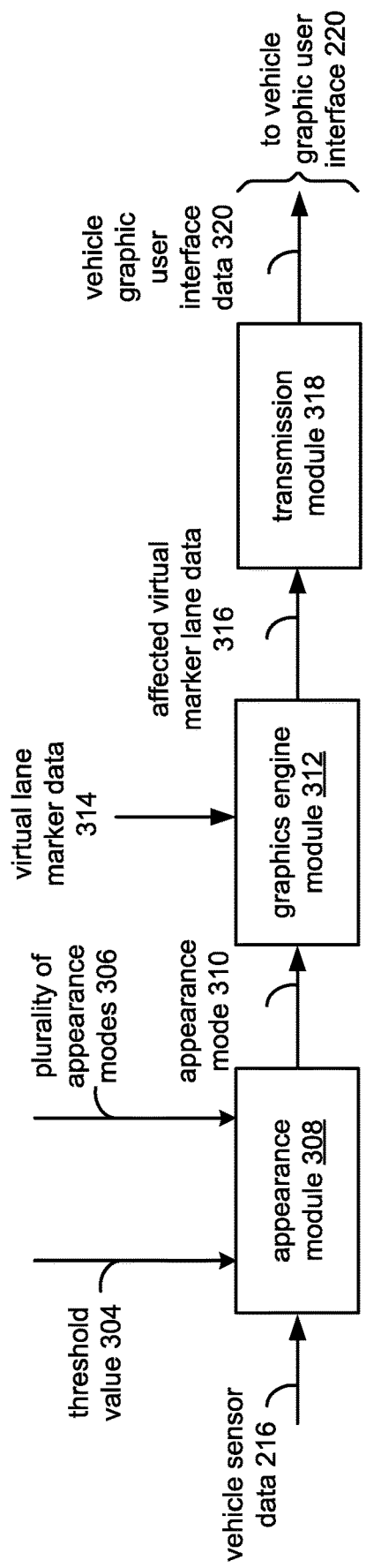
FIG. 3 illustrates a functional module block diagram for the vehicle control unit.

FIG. 3 illustrates a functional module block diagram stored in a memory 206 for vehicle control unit 110, where memory 206 stores an appearance module 308, a graphics engine module 312, and a transmission module 318.

The appearance module 308 includes instructions that, when executed by the processor, cause the processor to receive vehicle sensor data 216 relating to at least a spatial portion of an environment of the vehicle 100, and detecting objects and roadway boundaries for defining a lane of operation of the vehicle 100. The present examples may be directed to vehicle operations (e.g., a passenger vehicle, a sport utility vehicle, a sport vehicle, a cargo vehicle, etc.).

The appearance module 308 may access a threshold value 304 and a plurality of appearance modes 306 via a database 305. The threshold value 304 may include a predetermined time period 302 that may prompt a different appearance mode based on the vehicle sensor data 216 in relation to the threshold value 304.

For example, an appearance mode relating to the threshold may change to another appearance mode following the expiration of the predetermined time period (such as, the vehicle speed exceeds a speed limit value for longer than the predetermined time period). Also, the predetermined time period may indicate a "grace period" before changing from a current appearance mode to another appearance mode relating to exceeding the threshold for the operation of the vehicle. As may be appreciated, a current appearance may be changed to a different appearance mode upon exceeding the threshold value 304 to provide feedback of passing the threshold value 304, and upon expiration of the predetermined time period while exceeding the threshold value 304, another appearance mode 306 may be selected for display via a vehicle graphical user interface 220. Inputs to the appearance module 308 are discussed in detail with reference to FIG. 4.

Based on the vehicle sensor data 216, the threshold value 304, and the plurality of appearance modes 306, the appearance module 308 may generate an appearance mode 310. The graphics engine module 312 may receive the appearance mode 310 and non-enhanced virtual lane marker data 314.

The plurality of appearance modes 306 may include different display attributes for vehicle sensor data 216 based on the threshold value 304. The display attributes may include a quality assigned to a character and/or image for display via the vehicle graphical user interface 220. Examples of display attributes may include color, intensity, static patterns, modulating pattern effects, oscillating pattern effects, etc., as may be applied to non-enhanced virtual lane marker data 314 and respective backgrounds.

As may be appreciated, the non-enhanced virtual lane marker data 314 may be based on lane information extracted from image data, such as via object sensor devices 102 (FIG. 1) that may be provided in a format suitable for use in autonomous vehicle operation and/or driver-assist applications for the vehicle 100.

Generally, as an example, lane definition may be based on relative contrast of physical lane markers (such as centerlines, shoulder markers, such as painted solid and/or dashed lines, lane reflector makers, etc.) for improved roadways, as well as inferring lane boundaries for unimproved roadways (such as contrast between a dirt road having travel wear forming the path, as well as outer shoulder regions covered in grasses, trees, etc. that as a whole relay a path), etc. In this regard, the non-enhanced virtual lane marker data 314 may define a vehicle route including a virtual lane with first and second lane markers for accommodating the vehicle 100. Examples of enhanced and non-enhanced virtual lane marker data 314 display are discussed in detail with reference to FIGS. 6 and 7.

The graphics engine module 312 may operate to receive the appearance mode 310 of the plurality of appearance modes 306 from the appearance module 308. The graphics engine module 312 includes instructions that, when executed by the processor, cause the processor to affect the non-enhanced virtual lane marker data 314 with the appearance mode 310 to produce enhanced virtual marker lane data 316. As may be appreciated, the appearance mode 310 operates to convey vehicle sensor data 216 in relation to the threshold value 304 via a vehicle graphical user interface 220.

The transmission module 318 may receive the enhanced virtual marker lane data 316, and produce vehicle graphical user interface data 320 for transmission to a vehicle graphical user interface 220. As may be appreciated, vehicle graphical user interface data 320 may be displayed for varying screens and devices, such as head unit displays, heads up displays, dashboard displays, etc.

In operation, the transmission module 318 includes instructions that, when executed by the processor, cause the processor to transmit the enhanced virtual lane marker data 316 as vehicle graphical user interface data 320 for display by the vehicle graphical user interface 220. The instructions may include formatting information and communication protocol information for producing the vehicle graphical user interface data 320 from the enhanced virtual marker lane data 316 for display to one or more display devices.

Figure 4:
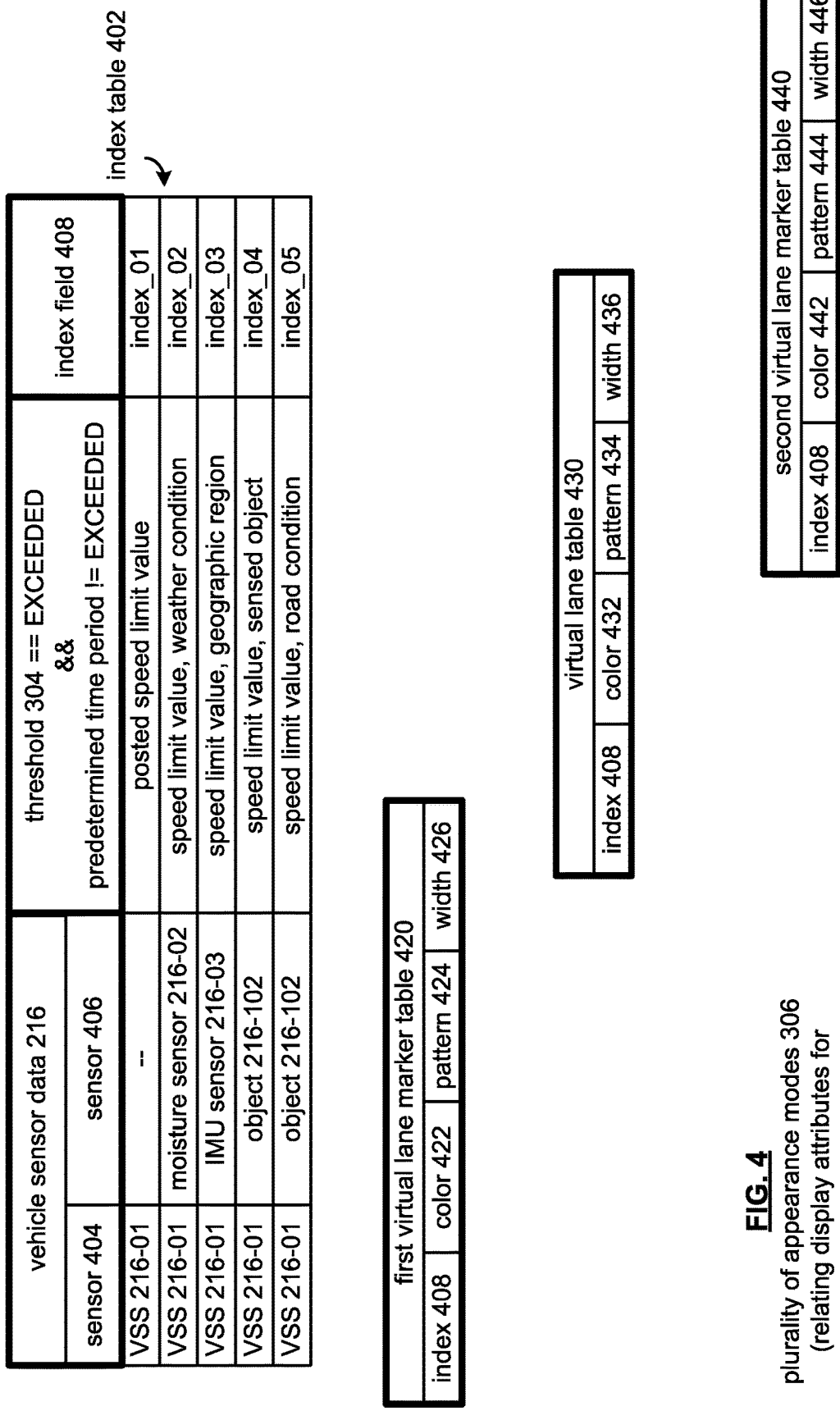
FIG. 4 illustrates an example of appearance modes accessible by the vehicle control unit of FIG. 1 to produce enhanced virtual lane marker data.

FIG. 4 illustrates an example of the plurality of appearance modes 306 presented by an index table format. The plurality of appearance modes 306 may be accessed through an index table 402, which may provide indices to respective display attributes that may be accessed from a first virtual lane marker table 420, virtual lane table 430, and a second virtual lane marker table 440.

The index table 402, by way of example, includes a field relating to vehicle sensor data 216, a field relating to a threshold 304, and to a predetermined time period, when present, and a field relating to an index 408 into display attributes for the virtual lane marker data.

The field for the vehicle sensor data 216 may include, by way of example, a singular data sensor field, or multiple vehicle sensor fields, such as fields for a sensor 404 and a sensor 406 designated by data identifiers.

For example, the sensor 404 may relate to vehicle speed sensor data 216-01 of the vehicle sensor data 216. Generally, the virtual lane marker data may operate to convey to a vehicle user a speed of the vehicle in relation to a speed limit.

As may be appreciated, vehicle speed sensor data 216-01 may also be considered in combination with other sensor devices of a vehicle, such as a moisture sensor data 216-02 (relating to rain, snow, sleet, etc.), an inertial measurement sensor data 216-03 (e.g., geolocation data of a vehicle), an object sensor device data 216-102 (e.g., as may relate to objects proximate to a vehicle route, road condition (such as primitive, improved, lane marker detection, etc.)), that may be considered alone and/or in combination.

In the example, when considering a vehicle speed in ideal operation conditions (such as an improved roadway, no precipitation, no detected objects proximate a vehicle route, etc.), the threshold 304, which for example is a speed limit, relates to a posted speed limit value. The posted speed limit value may be determined from visual processing of roadway signage via object sensor devices 102 (FIG. 1), via vehicle-to-infrastructure communications, via vehicle-to-vehicle communications, via map layer data information for roadway segments received through wireless communications, etc. When the threshold 304 is exceeded (e.g., posted speed limit value) based on the sensor data input 404, index_01 may be accessed for display attributes relating to the condition.

Similarly, other values for threshold 304 may present other appearance modes. For example, a threshold 304 for a speed limit value based on a weather condition (e.g., light rain, heavy rain, ice, foggy, etc.), a threshold 304 for a speed limit value based on a geographic region (e.g., rugged terrain, undeveloped terrain, mountainous roadway, etc.), a threshold 304 for a speed limit value based on a sensed object (e.g., a pedestrian, a bicyclist, another vehicle crossing in front, a child's ball entering a roadway, etc.), a threshold 304 for a speed limit value based on a sensed roadway condition (improved road, unimproved road, heavy traffic congestion, etc.).

In the example table structure of FIG. 4, when a comparison of vehicle sensor data 216 with a threshold value 304 indicates the threshold value is exceeded, an appearance mode of the plurality of appearance modes may be selected, as further indexed via a value index_01, index_02, index_03, index_04, index_05, etc., of the index 408.

The value of the index field 408 operates to point and/or index into tables 420, 430, and 440. The tables include display attributes to affect an appearance of non-enhanced virtual maker lane data 314 (FIG. 3). For example, first virtual lane marker table 420 includes fields for index 408, color 422, pattern 424, width 426, etc., for display attributes of a first virtual lane marker of the virtual marker lane data 314. Virtual lane table 430 includes fields for index 408, color 432, pattern 434, width 436, etc., for display attributes of a virtual lane of the virtual marker lane data 314. Second virtual lane marker table 440 includes fields for index 408, color 442, pattern 444, width 446, etc., for display attributes of a first virtual lane marker of the virtual marker lane data 314. Effect of various display attributes are discussed in detail with reference to FIGS. 5-7.

Figure 5:
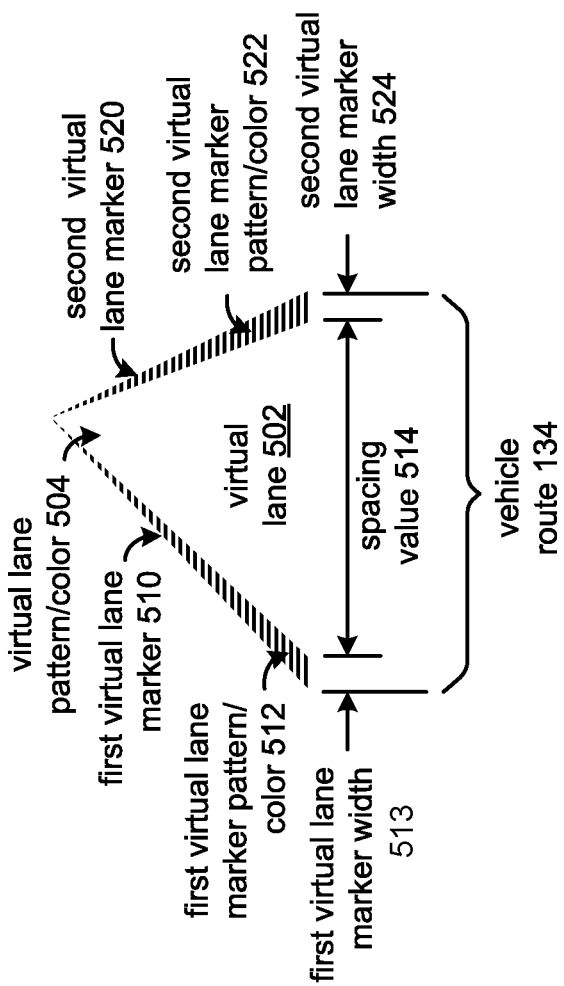
FIG. 5 illustrates an example of non-enhanced virtual lane marker data related to a vehicle route.

FIG. 5 illustrates an example of non-enhanced display attributes 500 for enhancement of virtual lane marker data 314 in relation to a vehicle route 134. Virtual lane marker data 314 may include a virtual lane 502 that may be bordered by a first virtual lane marker 510 and a second virtual lane marker 520.

The virtual lane marker data 314 may be displayed in a perspective view to follow sensed road lanes of a vehicle route 134. As may be appreciated, for example, object sensor devices 102 (FIG. 1) may be used to generate the virtual lane marker data.

For driving purposes, including autonomous, driver-assist and/or manual operation, physical lane markers may include painted road markings, lane reflector tabs, curbs, etc. Also, travel routes may generally be delineated based on defined via mapping data layers, sensed-differentiation of roadways in unimproved or primitive environments, etc.

Painted lane markings, as an example, may be detected from the intensity readings of an objected sensor device(s) 102, such as a LIDAR-based device. Curbs in the vehicle route 134 may also be sensed as small height changes in the range data of the object sensor device(s) 102. In contrast to camera imaging technology, laser reflectivity and range data may operate to disregard background lighting and shadows while producing sparse LIDAR point cloud data. Subsequent scans may increase the point cloud data, and further corroborated by GPS/IMU (Global Positioning Satellite/Inertial Measurement Unit) sensor device data via a location and IMU sensor device, for example.

The non-enhanced display attributes 500 may be based on general user preferences, or factory set preferences, for display to a vehicle graphical user interface. The virtual lane 502 may include a virtual lane pattern/color 504, and a spacing value 514. Bordering a first edge of the virtual lane 502 may include a first virtual lane marker 510, and a second virtual lane marker 520 on the other edges. The non-enhanced virtual lane marker data 314 may reflect contours of the vehicle route 134 as displayed and/or presented to a vehicle operator. In this manner, the virtual markers may correspond with that of the roadway for improving comprehension by a vehicle operator.

A first virtual lane marker 510 may include a first virtual lane marker pattern/color 512, and a first virtual lane marker width 513. The second virtual lane marker 520 may include a second virtual lane marker pattern/color 522, and a second virtual lane marker width 524. As may be appreciated, an appearance mode of the virtual lane marker data 314 may be selected based on vehicle sensor data 216, and with respect to a threshold to convey further visual information to a vehicle user via a vehicle graphical user interface, as is discussed in detail with reference to FIGS. 6-8.

Figure 6:
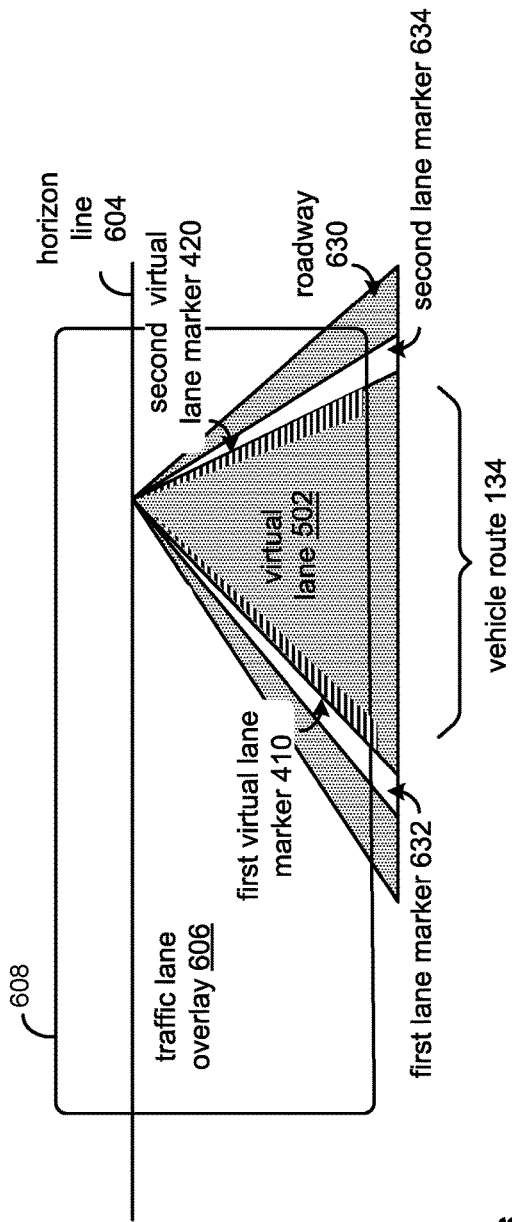
FIG. 6 illustrates a vehicle graphical user interface displaying an example of non-enhanced virtual lane marker data.

FIG. 6 illustrates a vehicle graphical user interface 220 displaying an example of non-enhanced virtual lane marker data 314. The vehicle graphical user interface 220 may include a screen 608 that may provide a traffic lane overlay 606.

The screen 608 may include a sufficiently transparent medium to present data, such as virtual lane marker data 314, without requiring a vehicle operator and/or passenger to look away from outside environment viewpoints. Examples may include micro-display technologies such as liquid crystal display (LCD), liquid crystal on silicon (LCoS), digital micro-mirrors (DMD), organic light-emitting diode (OLED), etc. Such displays may be separate with respect to a windshield of a vehicle or provided in combination therewith. Also, a screen 608 may be provided by the windshield, in which a material composition may be introduced to accentuate reflected display projector lighting to the field-of-view of the operator and/or passenger, an opaque film may be applied to enhance the display of non-enhanced virtual lane marker data 314, etc.

As may be appreciated, because a respective view of the vehicle operator's eyes is different, the vehicle graphical user interface 220 may be viewable by one or both eyes. Also, the presentation of the virtual lane marker data 314 is collimated such that the virtual lane marker data 314 and the outer vehicle environment are perceived as near optical infinity, without refocusing from the image displayed by the screen 608 to the outside vehicle environment. Also, as may be appreciated, the screen 608 may be aligned with the vehicle's axes, also referred to as boresighting. In this regard, the virtual lane marker data 314 may be presented as aligned (physically and/or via image compensation algorithms) with the outside vehicle environment as relayed by the overlay 606.

The overlay 606 may function to combine non-enhanced virtual lane marker data 314 with a view of the outer vehicle environment within a field-of-view of the vehicle operator. The example of FIG. 6 provides an outer vehicle environment of a roadway 630 with respect to a horizon line 604, with an overlay 606 of the virtual lane marker data 314.

Based on the first lane marker 632 and second lane marker 634 of the roadway 630, as may be determined via object sensor devices 102 (FIG. 1), the virtual lane marker data 314 may be aligned to represent a virtual lane 502.

The virtual lane 502 may correspond with a vehicle route 134, which may be selected by a vehicle user as a destination input, based on a vehicle origination location. Generally, as a vehicle travels a vehicle route 134 to a destination, the virtual lane 502 may relate navigation information to a vehicle operator (such as which road fork to take, when to exit, change lanes to prepare for an upcoming turn, etc.). For clarity, a simplified vehicle route 134 is presented, with the understanding that non-enhanced virtual lane marker data 314 may operate to relay roadway and/or navigation information for various road types (such as improved, multi-lane improved, highways, byways, interstates, unimproved surfaces, primitive surfaces, etc.), as well as for non-linear sections of roadway 630.

In an autonomous operation, the non-enhanced virtual lane marker data 314 may operate to provide operational feedback to a vehicle passenger (that is, a form of human-to-machine communication). Generally, the colors, patterns, widths, etc. of the elements of the non-enhanced virtual land marker data 314 may be based on user selected parameters, factory set parameters, etc.

As may be appreciated, the virtual lane marker data 314 may convey additional operational states of the vehicle, as well information relating to the vehicle route 134.

Figure 7:
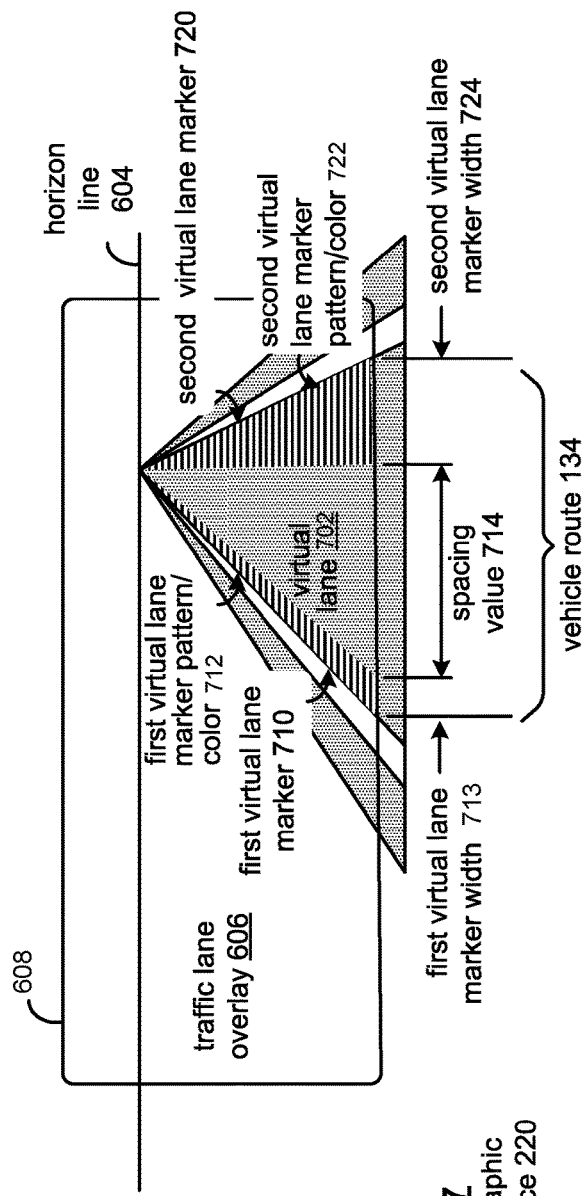
FIG. 7 illustrates a vehicle graphical user interface displaying an example of enhanced virtual lane marker data.

FIG. 7 illustrates an example of the vehicle graphical user interface 220 displaying enhanced virtual lane marker data 316 based on vehicle sensor data in relation to a threshold value.

The vehicle sensor data may generally relate, for example to vehicle speed, detected objects, etc. With respect to vehicle speed, vehicle speed thresholds may relate to posted speed limits (such as speed signs, vehicle-to-infrastructure data), weather conditions, geographic regions (such as urban terrain, residential terrain, hilly terrain), sensed objects in relation to a vehicle route 134, condition of the roadway 630 (such as improved, unimproved, dirt, gravel, unmarked), etc.

In this respect, vehicle sensor data 216 may relate to one or more sensor devices. The vehicle sensor data 216 may then be compared with a corresponding threshold value. As an example, a posted speed limit value for a residential area may be thirty miles-per-hour. In general, with favorable weather conditions (e.g., good visibility, dry roadway surface, low roadway congestion, etc.), a threshold value may be thirty miles-per-hour, which may be compared with vehicle sensor data 216 (such as by a vehicle speed sensor device).

As another example, though the posted speed limit value may be thirty miles-per-hour, another vehicle sensor device (such as an object sensor device 102 of FIG. 1) may produce "sensed object" data with the vehicle sensor data 216. For this example, the threshold value 304 may be a speed limit value, a sensed object that in effect lowers the value below the thirty miles-per-hour posted speed limit. Other examples affecting an upper value of a speed limit may include vehicle sensor data indicating adverse weather conditions, road conditions (such as potholes, poor road markings, gravel, narrow lanes), etc.

As also may be appreciated a posted speed limit for a roadway 630 may indicate an upper limit of a threshold value. Other upper limits for a threshold value may be considered based on regional custom. For example, a highway may have a posted speed limit of sixty miles-per-hour; however, a regional custom may be that vehicle operators drive at an "effective" seventy miles-per-hour speed limit on the highway. An effective speed limit may be based on vehicle-to-infrastructure data, vehicle-to-vehicle data, crowd-sourced data (that is, movement of respective handheld mobile devices, via on-board GPS devices, for a roadway), etc.

Accordingly, an appearance mode of a plurality of appearance modes may be selected based on the vehicle sensor data in relation to a threshold value. Still referring to FIG. 7, when the vehicle sensor data exceeds the threshold value, the appearance mode may convey the vehicle status via the enhanced lane marker data 316 based on at least one of a first virtual lane marker width 713 and pattern/color 712, a second virtual lane marker width 724 and pattern/color 722, and a virtual lane 702 having a first virtual lane marker width 713. As may be appreciated, the virtual lane 702 may also include a pattern/color, which may complement those of the virtual lane markers 510 and 520. Further, the widths 713 and 724, the pattern/colors 712 and 722, and the spacing value 714 may be different from one another to operate to direct attention of a vehicle operator, or prompt a user response, while also providing enhanced virtual lane marker data 316 to the overlay 606.

In an example where the vehicle speed may exceed a threshold value, the pattern/color 712 and 722 for a respective appearance mode may attract the vehicle operator's attention and emphasis the state of operation. With respect to colors, red may convey "warning," yellow may convey "caution," green may convey "safety", etc.

As may be appreciated, the pattern/color 712 and 722 (as well as for the virtual lane 702) may operate to prompt a user response, such as decreasing vehicle speed. That is, the vehicle graphical user interface 220 may operate to produce a desired behavior, which in the present example is maintaining vehicle velocity within a threshold value.

Generally, color/pattern selection for a display may operate to draw the attention of a vehicle operator to aspects of the outside vehicle environment. For example, an object sensor device may detect a pedestrian proximal to the travel route 134 of second virtual lane marker 520. To bring attention to the pedestrian by the vehicle operator, a spacing of the spacing value 714 may be adjusted relative to first virtual lane marker 510 (FIG. 6), and dynamically assigning a color coding to the first and second virtual lane markers 510 and 520.

In FIG. 7, the second virtual lane marker pattern/color 722 may also appear to oscillate, modulate, reciprocate adjacent (virtually) a location of the pedestrian, and the width 724 may increase (in relation to width 524 of FIG. 6) to prompt a cautious user response by the vehicle operator. The first virtual lane marker pattern/color 712 may be static and/or complement the pattern/color 722 to direct attention towards the pedestrian.

Also, a "pop-out" color may be used with the second virtual lane marker pattern/color 722. For example, for a virtual region of the second virtual lane marker 520 closest to the pedestrian, a red hue color may be used. In contrast, a blue hue color may be used for other regions of the marker 520.

As may be appreciated, the number of colors to convey information may be a smaller set because larger sets may slow the vehicle operator's search of "information," such as a pedestrian location. In general, a suitable set of colors may be up to six based on hue selection; more if suitable spacing may be available based on a display dimension of the screen 608.

Also, with respect to prompting a user response, reducing the spacing value 714, between first and second virtual lane markers 510 and 520 of the virtual lane 702 operates to subliminally prompt a vehicle user to decrease the vehicle velocity. When within a threshold, the first virtual lane marker width 713 and the second virtual lane marker width 724 may decrease, while the spacing value 714 for the virtual lane 702 may expand to convey to a vehicle user that the vehicle speed is within the threshold. While the pedestrian 740 is sensed, the second virtual lane marker width 724 may remain greater than the first virtual lane marker width 713, and the second virtual lane marker pattern/color 722 may differ from that of the first virtual lane marker pattern/color 712, so that the vehicle operator's attention may remain directed towards to the pedestrian.

When the vehicle sensor data may exceed the threshold value for a predetermined time period, a second appearance mode of a plurality of appearance modes may be selected to further escalate the condition, such as by further reducing the spacing value 714 for the virtual lane 702, and increasing first virtual lane marker width 713 and second virtual lane marker width 724.

Figure 8:
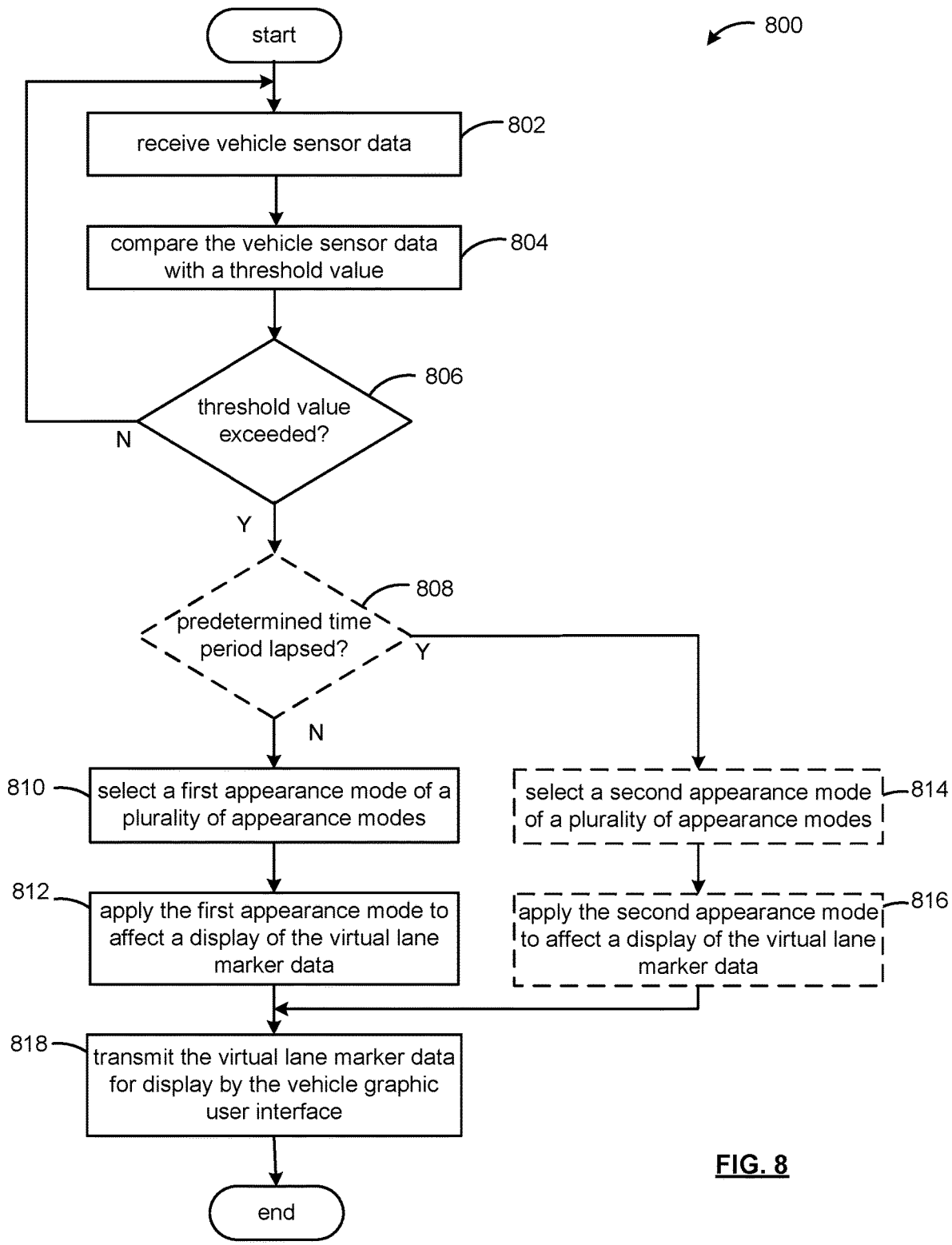
FIG. 8 shows an example process for enhancing virtual lane marker data to relay an operational state.

FIG. 8 shows an example process 800 for enhancing virtual lane marker data to produce enhanced virtual lane marker data.

At operation 802 vehicle sensor data may be received and at operation 804 compared with a threshold value. When, at operation 806, the threshold value is exceeded, an appearance mode of a plurality of modes may be selected at operation 810, wherein the appearance mode relates relating to the vehicle sensor data and the threshold value.

As an example, the vehicle sensor data may relate an output of a vehicle speed sensor device, and the threshold value may relate to a posted speed limit for the roadway.

Further, when the vehicle sensor data exceeds the threshold value and a predetermined time period is exceeded and/or lapsed, at operation 808, indicated in hashed lines, another, or second, appearance mode may be selected. As may be appreciated, the first and the second appearance mode are different with respect to one another. In effect, the second appearance mode may operate to escalate an alert and/or warning to a vehicle operator.

For the example of when a vehicle speed exceeding a threshold value, the first appearance mode may include colors, patterns (e.g., static, modulating, oscillating, strobe, etc.), sizes, etc., that operate to draw the vehicle operator/passenger attention to the vehicle speed. Further, when the vehicle sensor data may exceed a threshold value for a predetermined time period, such as a speed limit value, the second appearance mode may further enhance the appearance of a vehicle graphical user interface to bring attention to the vehicles operational condition, and to prompt a response by the vehicle user to alleviate the operational state of the vehicle. In the present example, the first and the second appearance modes may prompt the vehicle user to respond by returning the vehicle speed to below the speed limit value.

Following operation 810 in which a first appearance mode of the plurality of appearance modes is selected, the first appearance mode, at operation 812, may be applied to affect a display of virtual lane marker data.

Following operation 808, when a predetermined time period lapses, a second appearance mode of the plurality of appearance modes may be selected at operation 814, and at operation 816, the second appearance mode may be applied to produce enhanced virtual lane marker data.

From either of operation 812 or 816, the enhanced virtual lane marker data may be transmitted, at operation 818, for display by a vehicle graphical user interface.

The transmission may be via a vehicle network based on a communication protocol for wireline, wireless and/or a combination thereof.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method comprising:
   receiving vehicle sensor data;
   selecting an appearance mode of a plurality of appearance modes based on the vehicle sensor data in relation to a threshold value;
   applying the appearance mode to virtual lane marker data to produce enhanced virtual lane marker data, wherein applying the appearance mode operates to convey the vehicle sensor data in relation to the threshold value;
   selecting a second appearance mode of the plurality of appearance modes when the vehicle sensor data exceeds a threshold value for a predetermined time period;
   applying the second appearance mode to the virtual lane marker data to produce the enhanced virtual lane marker data, wherein applying the second appearance mode operates to further convey the vehicle sensor data in relation to the threshold value via a graphical user interface; and
   transmitting the enhanced virtual lane marker data for display by the vehicle graphical user interface.

2. The method of claim 1, wherein the enhanced virtual lane marker data, when displayed by the graphical user interface, includes a virtual traffic lane overlay.

3. The method of claim 1, wherein applying the appearance mode, based on the vehicle sensor data in the relation to the threshold value, operates to prompt a user response by:
adjusting a spacing value of a first virtual lane marker and a second virtual lane marker of the enhanced virtual lane marker data; and dynamically assigning a color coding to the first and second virtual lane markers.

4. The method of claim 3, wherein
the vehicle sensor data relates to vehicle velocity data; and
the threshold relates to a speed limit value.

5. The method of claim 4, wherein the speed limit value is defined according to at least one of:
a posted speed limit value;
a weather condition;
a geographic region;
a sensed object; and
a road condition.

6. The method of claim 1, wherein the appearance mode comprises at least one of:
color coding data for first virtual lane markers and second virtual lane markers of the enhanced virtual lane marker data;
color pattern data for the first and second virtual lane markers; and
spacing distance data for first and second virtual lane markers.

7. A method comprising:
receiving vehicle sensor data;
comparing the vehicle sensor data with a threshold value; and
when the vehicle sensor data exceeds the threshold value:
selecting an appearance mode of a plurality of appearance modes;
applying the appearance mode to virtual lane marker data to produce enhanced virtual lane marker data, wherein applying the appearance mode operates to convey the vehicle sensor data in relation to the threshold value via a vehicle graphical user interface;
selecting a second appearance mode of the plurality of appearance modes when the vehicle sensor data exceeds a threshold value for a predetermined time period;
applying the second appearance mode to the virtual lane marker data to produce the enhanced virtual lane marker data, wherein applying the second appearance mode operates to further convey the vehicle sensor data in relation to the threshold value via the vehicle graphical user interface; and
transmitting the enhanced virtual lane marker data for display by the vehicle graphical user interface.

8. The method of claim 7, wherein applying the appearance mode functions to prompt a user response by:
adjusting a spacing value of a first virtual lane marker and a second virtual lane marker of the enhanced virtual lane marker data;
assigning a first color coding to the first and second virtual lane markers.

9. The method of claim 7, wherein applying the second appearance mode of the plurality of appearance modes functions to further prompt a user response by:
assigning a second color coding and a non-static pattern to the virtual lane marker data.

10. The method of claim 7, wherein the enhanced virtual lane marker data, when displayed by the vehicle graphical user interface, includes a virtual traffic lane overlay.

11. The method of claim 7, wherein:
the vehicle sensor data includes vehicle velocity data; and
the threshold relates to a speed limit value.

12. The method of claim 11, wherein the speed limit value is defined according to at least one of:
a posted speed limit value;
a weather condition;
a geographic region;
a sensed object; and
a road condition.

13. A vehicle control unit comprising:
a communication interface to service communication with a vehicle network;
a processor communicably coupled to the communication interface; and
a memory communicably coupled to the processor and storing:
an appearance module including instructions that, when executed by the processor, cause the processor to:
receive vehicle sensor data;
compare the vehicle sensor data with a threshold value;
when the vehicle sensor data exceeds the threshold value, select an appearance mode of a plurality of appearance modes; and
when the vehicle sensor data exceeds the threshold value for a predetermined time period, select a second appearance mode of the plurality of appearance modes; and
a graphics engine module including instructions that, when executed by the processor, cause the processor to:
apply the appearance mode to virtual lane marker data to produce enhanced virtual maker lane data, wherein applying the appearance mode operates to convey the vehicle sensor data in relation to the threshold value via a vehicle graphical user interface; and
apply the second appearance mode to affect the display of the enhanced virtual lane marker data, wherein applying the second appearance mode operates to further convey the vehicle sensor data in relation to the threshold value via the graphical user interface; and
a transmission module including instructions that, when executed by the processor, cause the processor to:
transmit the enhanced virtual lane marker data as vehicle graphical user interface data via the communications interface for display by the vehicle graphical user interface.

14. The vehicle control unit of claim 13, wherein applying the appearance mode functions to prompt a user response by:
adjusting a spacing value of a first virtual lane marker and a second virtual lane marker of the enhanced virtual lane marker data;
assigning a first color coding to the first and second virtual lane marker.

15. The vehicle control unit of claim 13, wherein the graphics engine module further includes instructions that, when executed by the processor, cause the processor to apply another appearance mode that functions to further prompt a user response by:

assigning a second color coding to the first and the second virtual lane markers, wherein the second color coding includes a modulating pattern.

16. The vehicle control unit of claim 13, wherein the enhanced virtual lane marker data, when displayed by the vehicle graphical user interface, includes a virtual traffic lane overlay.

17. The vehicle control unit of claim 13, wherein the vehicle sensor data includes vehicle velocity data; and
the threshold relates to a speed limit value.

18. The vehicle control unit of claim 17, wherein the speed limit value comprises at least one of:
a posted speed limit value;
a weather condition;
a geographic region;
a sensed object; and
a road condition.

* * * * *

UNITED STATES PATENT AND TRADEMARK OFFICE
CERTIFICATE OF CORRECTION

PATENT NO. : 10,633,027 B2
APPLICATION NO. : 15/629046
DATED : April 28, 2020
INVENTOR(S) : Todd J. Rowell Page 1 of 1

It is certified that error appears in the above-identified patent and that said Letters Patent is hereby corrected as shown below:

In the Claims

Column 14, Lines 57-58, should read:
vehicle sensor data exceeds the threshold value for a predetermined time period;

Column 15, Lines 45-46, should read:
the vehicle sensor data exceeds the threshold value for a predetermined time period Signed and Sealed this
Tenth Day of November, 2020

Andrei Iancu
*Director of the United States Patent and Trademark Office*